(12) United States Patent
Shepelev et al.

(10) Patent No.: US 11,175,177 B2
(45) Date of Patent: Nov. 16, 2021

(54) SYSTEMS AND METHODS FOR DETECTING AMBIENT LIGHT OR PROXIMITY WITH AN OPTICAL SENSOR

(71) Applicant: Synaptics Incorporated, San Jose, CA (US)

(72) Inventors: Petr Shepelev, Campbell, CA (US); Patrick A. Worfolk, San Jose, CA (US); Erik Jonathon Thompson, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 231 days.

(21) Appl. No.: 16/226,484

(22) Filed: Dec. 19, 2018

(65) Prior Publication Data

US 2020/0200596 A1    Jun. 25, 2020

(51) Int. Cl.
*G01J 1/42*     (2006.01)
*G09G 3/34*     (2006.01)

(52) U.S. Cl.
CPC .......... *G01J 1/4204* (2013.01); *G09G 3/3413* (2013.01); *G09G 2360/144* (2013.01)

(58) Field of Classification Search
CPC ................ G01J 1/4204; G09G 3/3413; G09G 2360/144
See application file for complete search history.

(56) References Cited

U.S. PATENT DOCUMENTS

2011/0235871 A1*  9/2011  Byren ................. G06K 9/2036
                                                    382/124
2019/0304379 A1* 10/2019  Pytlarz ................ G09G 3/3406

* cited by examiner

Primary Examiner — Que Tan Le
Assistant Examiner — Don J Williams
(74) Attorney, Agent, or Firm — Leydig, Voit & Mayer, Ltd.

(57) ABSTRACT

A method for determining an amount of ambient light illumination is disclosed. The method includes: estimating a contribution per color component in an optical sensing region of an input frame to be displayed on a display device, wherein the optical sensing region corresponds to a location of an optical sensor in the display device, wherein the input frame comprises digital information for each color component for each pixel of the input frame; causing the optical sensor to detect an amount of illumination in the optical sensing region based on illuminating the display device with a representation of the input frame; and determining the amount of ambient light illumination based on the estimated contribution per color component in the optical sensing region of the input frame and the amount of illumination in the optical sensing region detected by the optical sensor.

13 Claims, 11 Drawing Sheets

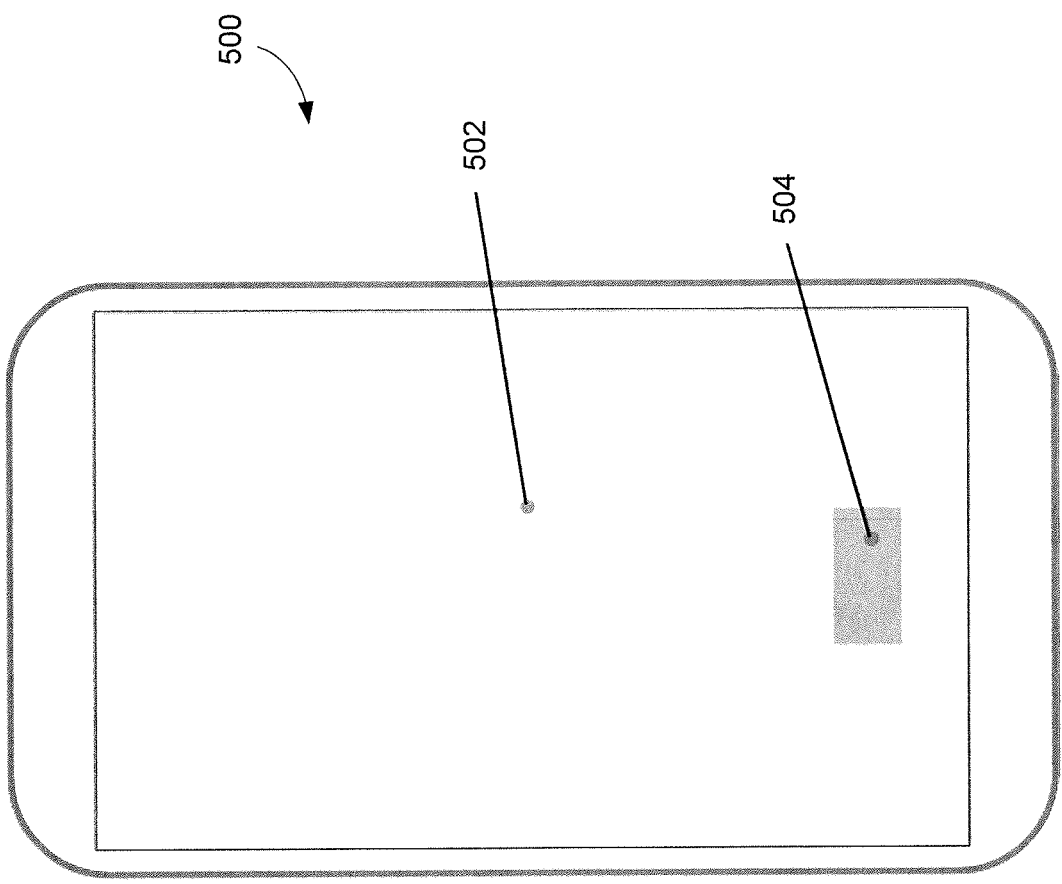

SYSTEMS AND METHODS FOR DETECTING AMBIENT LIGHT OR PROXIMITY WITH AN OPTICAL SENSOR

BACKGROUND

Electronic devices with a display screen, such as smartphones, are ubiquitous. One aspect of many electronic devices is the ability to change the brightness of the display screen based on the ambient light in the environment. For example, in a bright ambient environment (e.g., direct sunlight), the intensity or brightness of the display screen may be increased, and in a dark ambient environment (e.g., in a dark room at night), the intensity or brightness of the display screen may be decreased. Another common aspect of electronic devices is incorporating a proximity sensor on the electronic device that can determine whether an object (e.g., a user's head or hand) is placed in close proximity to the electronic device and adjust the display screen accordingly. For example, if the proximity sensor detects the presence of an object (e.g., a user places a phone next to the user's ear to have a phone conversation), then the display screen may be turned off (e.g., to save power).

SUMMARY

Some embodiments provide a method and device for determining an amount of ambient light illumination. The method includes: estimating a contribution per color component in an optical sensing region of an input frame to be displayed on a display device, wherein the optical sensing region corresponds to a location of an optical sensor in the display device, wherein the input frame comprises digital information for each color component for each pixel of the input frame; causing the optical sensor to detect an amount of illumination in the optical sensing region based on illuminating the display device with a representation of the input frame; and determining the amount of ambient light illumination based on the estimated contribution per color component in the optical sensing region of the input frame and the amount of illumination in the optical sensing region detected by the optical sensor.

Another embodiment provides a device for determining an amount of ambient light illumination. The device includes a display controller and an optical sensor controller. The display controller is configured to: receive an input frame from a host, wherein the input frame comprises digital information for each color component for each pixel of the input frame, perform digital-to-analog conversion on the input frame to generate one or more analog drive signals, determine an average brightness per color component in an optical sensing region of the input frame, wherein the optical sensing region corresponds to a location of an optical sensor in a display device, and cause the display device to be illuminated with a representation of the input frame based on the one or more analog drive signals. The optical sensor controller is configured to determine an average brightness per color component based on an amount of illumination detected by the optical sensor in the optical sensing region, wherein the amount of ambient light illumination is determined by the device based on the average brightness per color component in the optical sensing region of the input frame and the average brightness per color component detected by the optical sensor.

Yet another embodiment provides a controller configured to determine an amount of ambient light illumination, the controller comprising: first circuitry configured to estimate a contribution per color component in an optical sensing region of an input frame to be displayed on a display device, wherein the optical sensing region corresponds to a location of an optical sensor in the display device, wherein the input frame comprises digital information for each color component for each pixel of the input frame; second circuitry configured to cause the optical sensor to detect an amount of illumination in the optical sensing region based on illuminating the display device with a representation of the input frame; and third circuitry configured to determine the amount of ambient light illumination based on the estimated contribution per color component in the optical sensing region of the input frame and the amount of illumination in the optical sensing region detected by the optical sensor.

BRIEF DESCRIPTION OF THE DRAWINGS

FIG. 5 is a block diagram of an exemplary electronic device having a fingerprint sensor in the active display area.

DETAILED DESCRIPTION

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

As described in greater detail herein, disclosed are systems and methods for detecting ambient light and/or detecting the proximity of an object using an optical sensor. As used herein, ambient light refers to light that uniformly or nearly uniformly is incident onto the electronic device, e.g., onto the display screen of the electronic device. An optical sensor, such as a fingerprint sensor, can be included in an electronic device, such as a smartphone. The optical sensor can be used to sense an input object, such as a fingerprint of a finger, which can be used to authenticate a user of the electronic device. As disclosed herein, the optical sensor can also be used to detect ambient light and/or detect the proximity of an object using the optical sensor, as opposed to providing a dedicated ambient light sensor and/or proximity sensor. By performing ambient light detection and/or proximity detection using the optical sensor, the cost of the electronic device is decreased, since a dedicated ambient light sensor and a dedicated proximity sensor are no longer needed. In addition, by using the optical sensor for ambient light detection and/or proximity detection without the dedicated proximity sensor and the dedicated ambient light sensor, a display screen of the electronic device can extend from "edge-to-edge."

Figure 1:
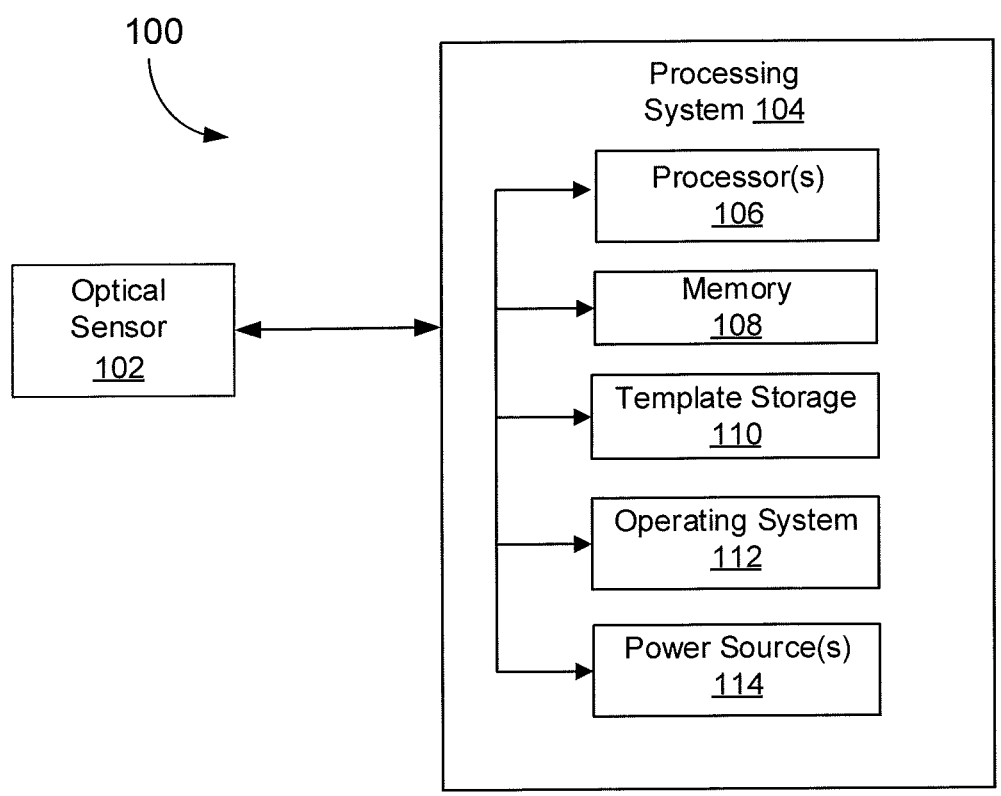
FIG. 1 is a block diagram of an example of a system that includes an optical sensor and a processing system, according to an embodiment.

Turning to the drawings, FIG. 1 is a block diagram of an example of an electronic device 100 that includes an optical sensor 102 and a processing system 104, according to an embodiment of the disclosure.

The processing system 104 may include processor(s) 106, memory 108, template storage 110, operating system (OS) 112, and power source(s) 114. Processor(s) 106, memory 108, template storage 110, and operating system 112 may be connected physically, communicatively, and/or operatively to each other directly or indirectly. The power source(s) 114 may be connected to the various components in processing system 104 to provide electrical power as necessary.

As illustrated, the processing system 104 may include processing circuitry including one or more processor(s) 106 configured to implement functionality and/or process instructions for execution within electronic device 100. For example, processor(s) 106 execute instructions stored in memory 108 or instructions stored on template storage 110 to normalize an image, reconstruct a composite image, identify, verify, or otherwise match a biometric object, or determine whether a biometric authentication attempt is successful. Memory 108, which may be a non-transitory, computer-readable storage medium, may be configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 may also maintain program instructions for execution by the processor(s) 106.

Template storage 110 may comprise one or more non-transitory computer-readable storage media. In the context of a fingerprint sensor device or system, the template storage 110 may be configured to store enrollment views or image data for fingerprint images associated with a user's fingerprint, or other enrollment information, such as template identifiers, enrollment graphs containing transformation information between different images or view, etc. More generally, the template storage 110 may store information about an input object. The template storage 110 may further be configured for long-term storage of information. In some examples, the template storage 110 includes non-volatile storage elements. Non-limiting examples of non-volatile storage elements include magnetic hard discs, solid-state drives (SSD), optical discs, floppy discs, flash memories, or forms of electrically programmable memories (EPROM) or electrically erasable and programmable (EEPROM) memories, among others.

The processing system 104 may also host an operating system (OS) 112. The operating system 112 may control operations of the components of the processing system 104. For example, the operating system 112 facilitates the interaction of the processor(s) 106, memory 108, and template storage 110.

According to some embodiments, the processor(s) 106 implements hardware and/or software to obtain data describing an image of an input object. In some implementations, the processor(s) 106 may also determine whether there is a match between two images, e.g., by aligning two images and compare the aligned images to one another. The processor(s) 106 may also operate to reconstruct a larger image from a series of smaller partial images or sub-images, such as fingerprint images when multiple partial fingerprint images are collected during a biometric process, such as an enrollment or matching process for verification or identification.

The processing system 104 may include one or more power source(s) 114 to provide power to the electronic device 100. For example, the power source(s) 114 may provide power to one or more of the components of the processing system 104 and/or to the optical sensor 102. In some implementations, the power source(s) 114 may be external to the processing system 104 or external to the electronic device 100. Non-limiting examples of power source(s) 114 include single-use power sources, rechargeable power sources, and/or power sources developed from nickel-cadmium, lithium-ion, or other suitable material as well power cords and/or adapters, which are in turn connected to electrical power.

Optical sensor 102 can be implemented as a physical part of the electronic device 100, or can be physically separate from the electronic device 100. As appropriate, the optical sensor 102 may communicate with parts of the electronic device 100 using any one or more of the following: buses, networks, and other wired or wireless interconnection and communication technologies, such as buses and networks. Examples technologies may include Inter-Integrated Circuit ($I^2C$), Serial Peripheral Interface (SPI), PS/2, Universal Serial bus (USB), Bluetooth®, Infrared Data Association (IrDA), and various radio frequency (RF) communication protocols defined by the IEEE 802.11 standard. In some embodiments, optical sensor 102 is implemented as a fingerprint sensor to capture a fingerprint image of a finger of a user. In accordance with the disclosure, the optical sensor 102 uses optical sensing for the purpose of object imaging including imaging biometrics such as fingerprints. The optical sensor 102 can be incorporated as part of a display, for example, or may be a discrete sensor.

Some non-limiting examples of electronic devices 100 include personal computing devices (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras).

In some embodiments, the optical sensor 102 may provide illumination to the sensing region. Reflections from the sensing region in the illumination wavelength(s) are detected to determine input information corresponding to the input object. The optical sensor 102 may also be used to determine the ambient light in the environment of the electronic device 100 and/or whether an object is in close proximity to the electronic device 100, as described in greater detail herein.

The optical sensor 102 may utilize principles of direct illumination of the input object, which may or may not be in contact with a sensing surface of the sensing region depending on the configuration. One or more light sources and/or light guiding structures may be used to direct light to the sensing region. When an input object is present, this light is reflected from surfaces of the input object, which reflections can be detected by the optical sensing elements and used to determine information about the input object.

The optical sensor 102 may also utilize principles of internal reflection to detect input objects in contact with a sensing surface. One or more light sources may be used to direct light in a light guiding element at an angle at which it is internally reflected at the sensing surface of the sensing region, due to different refractive indices at opposing sides of the boundary defined by the sensing surface. Contact of the sensing surface by the input object causes the refractive index to change across this boundary, which alters the internal reflection characteristics at the sensing surface, causing light reflected from the input object to be weaker at portions where it is in contact with the sensing surface. Higher contrast signals can often be achieved if principles of frustrated total internal reflection (FTIR) are used to detect the input object. In such embodiments, the light may be directed to the sensing surface at an angle of incidence at which it is totally internally reflected, except where the input object is in contact with the sensing surface and causes the light to partially transmit across this interface. An example of this is presence of a finger introduced to an input surface defined by a glass to air interface. The higher refractive index of human skin compared to air causes light incident at the sensing surface at the critical angle of the interface to air to be partially transmitted through the finger, where it would otherwise be totally internally reflected at the glass to air interface. This optical response can be detected by the system and used to determine spatial information. In some embodiments, this can be used to image small scale fingerprint features, where the internal reflectivity of the incident light differs depending on whether a ridge or valley is in contact with that portion of the sensing surface.

Figure 2:
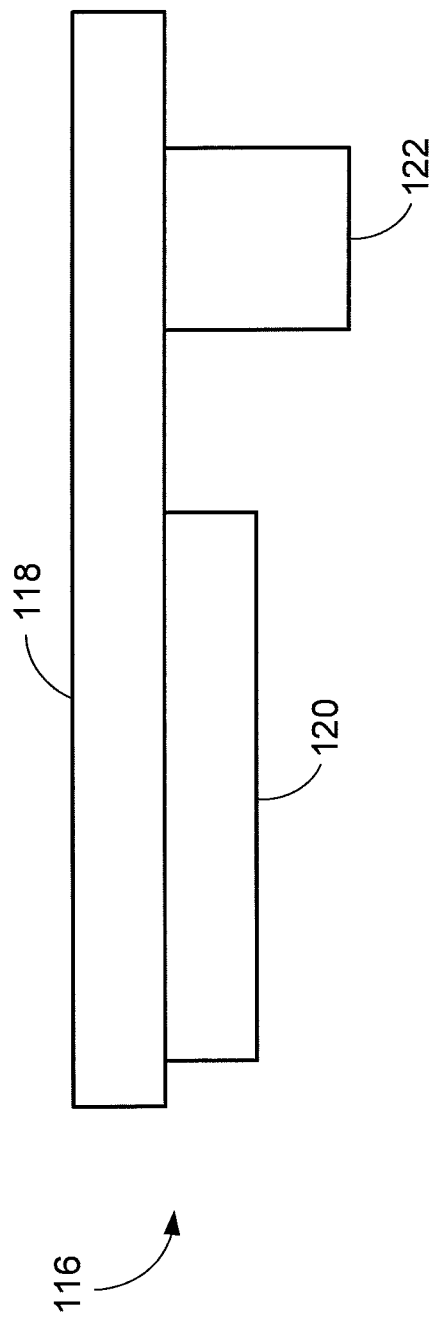
FIG. 2 illustrates an example of an electronic device that includes an optical sensor according to an embodiment.

FIG. 2 illustrates an example of an electronic device 116, such as a mobile phone, which includes a cover layer, e.g., cover glass 118, over a display 120. The disclosed method and system may be implemented such that the display 120 includes an optical sensor to image an input object. Alternatively, a separate discrete component 122 includes an optical sensor that provides the optical sensing capabilities. A discrete component 122 may provide more flexibility in designing the optical components of the sensor for optimum illumination and/or signal conditioning than when attempting to integrate the optical sensor components on a display substrate, such as a thin film transistor (TFT) backplane. In one embodiment, the discrete component 122 is not located beneath the display 120, as shown in FIG. 2. In another embodiment, the discrete component 122 is located beneath the display 120.

Figure 3A:
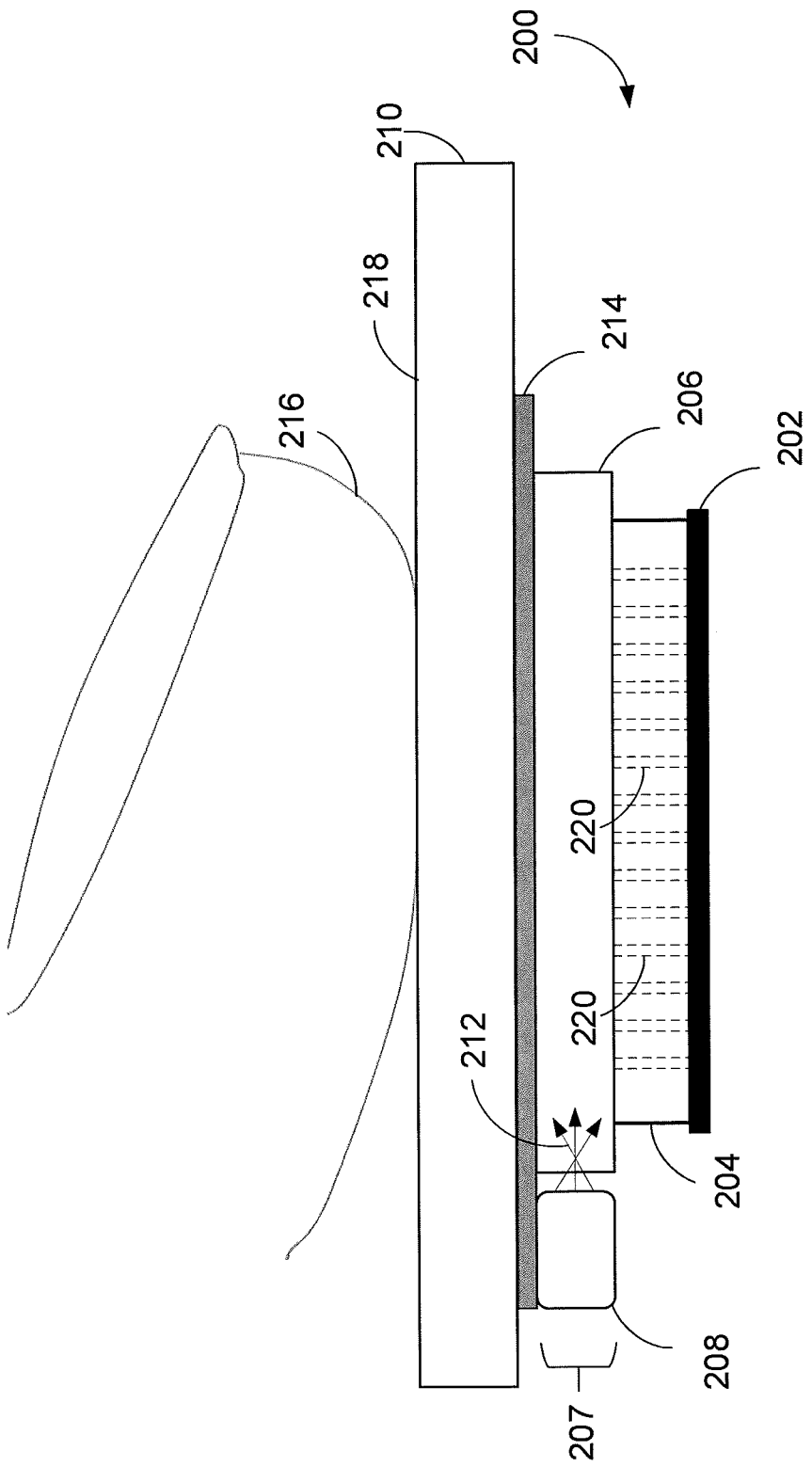
FIGS. 3A-3B illustrate examples of an optical sensor with a collimator filter layer according to an embodiment of the disclosure.

FIG. 3A illustrates an example of a stack-up for an optical sensor device 200 used to image an input object 216, such as a fingerprint. The optical sensor device 200 includes an image sensor array 202, a collimator filter layer (or light conditioning layer) 204 disposed above the image sensor array 202, an illumination layer 207 disposed above the collimator filter layer 204, a light source 208, and a cover layer 210. In certain embodiments, a blocking layer 214 may also be provided.

The cover layer 210 protects the inner components of the optical sensor device 200, such as the image sensor array 202. The cover layer 210 may include a cover glass or cover lens that protects inner components of a display in addition to the optical sensor device 200. A sensing region for the input object 216 is defined above the cover layer 210. A sensing surface 218 (i.e., top surface) of the cover layer 210 provides a contact area for the input object 216 (e.g., fingerprint). The cover layer 210 can be made of any suitable material such as glass, transparent polymeric materials and the like.

Although generally described in the context of a fingerprint for illustrative purposes, the input object 216 is any object to be imaged. The input object 216 may include various features, such as ridges and valleys. In general, when input object 216 comes into contact with the sensing surface 218, due to their protruding nature, the ridges contact the sensing surface 218 of the cover 210 layer. In contrast, the valleys do not contact the sensing surface 218 and instead form an air gap between the input object 216 and the sensing surface 218. The input object 216 may have other features such as stain, ink and the like that do not create significant structural differences in portions of the input object 216, but which affect its optical properties. The methods and systems disclosed herein are suitable for imaging such structural and non-structural features of the input object 216.

The illumination layer 207 includes a light source 208 and/or a light guiding element 206 that directs illumination to the sensing region in order to image the input object 216. As shown in FIG. 3A, the light source 208 transmits beams or rays of light 212 into the light guiding element 206 and the transmitted light propagates through the light guiding element 206. The light guiding element 206 may utilize total internal reflection, or may include reflecting surfaces that extract light up towards the sensing region. Some of the light in the illumination layer 207 may become incident at the sensing surface 218 in an area that is contact with the input object 216. The incident light is in turn reflected back towards the collimator filter layer 204. In the example shown, the light source 208 is disposed adjacent to the light guiding element 206. However, it will be understood that the light source 208 may be positioned anywhere within the optical sensor device 200 provided that emitted light reaches the light guiding element 206. For example, the light source 208 may be disposed below the image sensor array 202. Moreover, it will be understood that a separate light guiding element 206 is not required. For example, the light transmitted from the light source 208 can be transmitted directly into the cover layer 210 in which case the cover layer 210 also serves as the light guiding element. As another example, the light transmitted from the light source 208 can be transmitted directly to the sensing region, in which case the light source 208 itself serves as the illumination layer. In some embodiments, as described in greater detail in FIG. 3B, a discrete light source is not required, as the light from a display layer can be used to illuminate the input object 216 (e.g., finger).

The light provided by the illumination layer 207 to image the input object 216 may be in near infrared (NIR) or visible. The light can have a narrow band of wavelengths, a broad band of wavelengths, or operate in several bands.

The image sensor array 202 detects light passing through the collimator filter layer 204. Examples of suitable sensor arrays are complementary metal oxide semiconductor (CMOS) and charge coupled device (CCD) sensor arrays. The sensor array 202 may include a plurality of individual optical sensing elements capable of detecting the intensity of incident light. In some embodiments, the image sensor array 202 is formed in a silicon sensor substrate. In other embodiments, the image sensor array 202 is formed on a glass thin film transistor substrate.

To achieve optical sensing of fingerprints and fingerprint-sized features through thicker cover layers 210, light reflected from the fingerprint is conditioned by the collimator filter layer 204 so that the light reaching a sensing element in the image sensor array 202 comes from a small spot on the input object 216 directly above or nearly directly above the sensor element. In the absence of such conditioning, any light arriving at a sensing element from a region on the object far away from the optical sensing elements contributes to image blurring.

To condition the light in accordance with the disclosure, the collimator filter layer 204 is provided with an array of apertures, or collimator holes, 220 with each aperture being directly above one or more optical sensing elements on the image sensor array 202.

The collimator filter layer 204 allows light rays reflected from the input object 216 (e.g., finger) at normal or near normal incidence to the collimator filter layer 204 to pass and reach the optical sensing elements of the image sensor array 202. In one embodiment, the collimator filter layer 204 is an opaque layer with array of holes 220. The collimator filter layer 204 may be laminated, stacked, or built directly above the image sensor array 202. By way of example, the collimator filter layer 204 may be made of a plastic material such as polycarbonate, PET, polyimide, carbon black, inorganic insulating or metallic materials, silicon, or SU-8. In certain embodiments, the collimator filter layer 204 is monolithic.

An optional blocking layer 214 may be part of optical sensor device 200. The blocking layer 214 may be a semitransparent or opaque layer and may be disposed above the collimator filter layer 204. For example, the blocking layer 214 may be disposed between the cover layer 210 and the illumination layer 207, as shown in FIG. 3A. Alternatively, the blocking layer 214 may be disposed between the illumination layer 207 and the collimator filter layer 204. The blocking layer 214 may be configured to obscure ambient light illumination from reaching the image sensor array 202, while still allowing the optical sensor device 200 to operate. The blocking layer 214 may include a number of different materials or sub-layers. For example, a thin metal or electron conducting layer may be used where the layer thickness is less than the skin depth of light penetration in the visible spectrum. Alternatively, the blocking layer 214 may include a dye and/or pigment or several dyes and/or pigments that absorb light, for example, in the visible spectrum. As yet another alternative, the blocking layer 214 may include several sub-layers or nano-sized features configured to cause interference with certain wavelengths, such as visible light for example, so as to selectively absorb or reflect different wavelengths of light. The light absorption profile of the blocking layer 214 may be formulated to give a particular appearance of color, texture, or reflective quality thereby allowing for particular aesthetic matching or contrasting with the device into which the optical sensor device 200 is integrated. In some embodiments, a semitransparent layer may be used with visible illumination wavelengths to allow sufficient light to pass through the blocking layer to the sensing region, while still sufficiently obscuring components below.

Figure 3B:
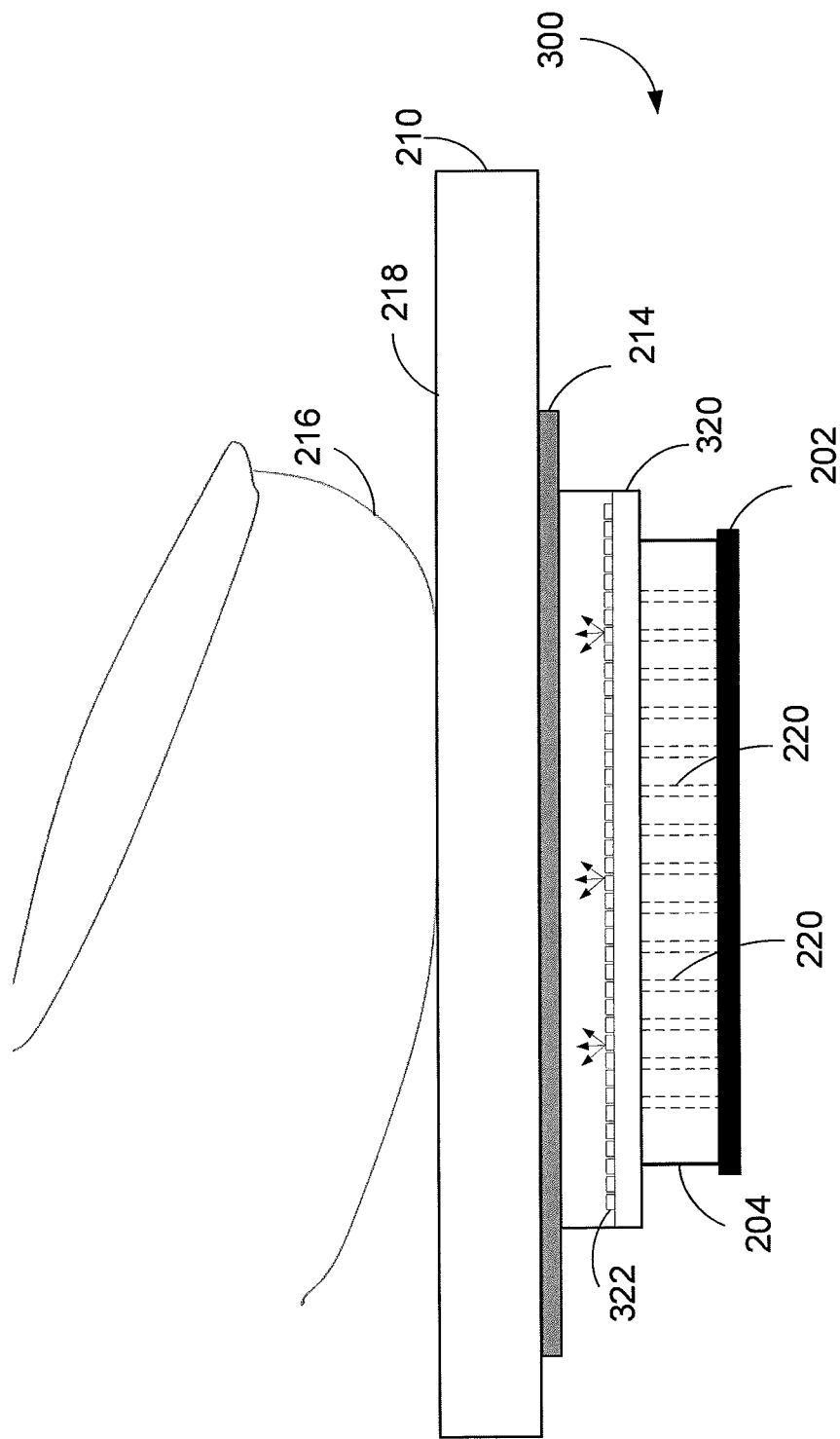

FIG. 3B illustrates another example of a stack-up for an optical sensor device 300. The optical sensor device 300 includes an image sensor array 202, a collimator filter layer (or light conditioning layer) 204 disposed above the image sensor array 202, a display layer 320 disposed above the collimator filter layer 204, and a cover layer 210. In some embodiments, an optional blocking layer 214 may also be provided. As shown in FIG. 3B, light from the display layer 320 may be used to illuminate the input object 216 (e.g., finger). In this embodiment, a discrete light source is not required.

The display layer 320 may comprise the display screen of an electronic device and may include a plurality of light sources 322. The display layer 320 may be any type of dynamic display capable of displaying a visual interface to a user, and may include any type of light sources 322, such as emitting diodes (LEDs), organic LEDs (OLEDs), cathode ray tube (CRT), liquid crystal display (LCD), plasma, electroluminescence (EL), or other display technology. The display layer 320 may also be flexible or rigid, and may be flat, curved, or have other geometries. In some embodiments, the display layer 320 includes a glass or plastic substrate for TFT circuitry and/or other circuitry, which may be used to provide visuals and/or provide other functionality. The cover layer 210 is disposed above display layer 320 and may provide a sensing surface 218 for the input object 216. Example cover layer 210 materials include plastic, optically clear amorphous solids, such as chemically hardened glass, as well as optically clear crystalline structures, such as sapphire.

When sensing input objects, e.g., sensing fingerprints or fingerprint-sized features through thicker cover layers 210, light emitted by the light sources 322 of the display layer 320 reflected from the input object 216 may be conditioned by the collimator filter layer 204 so that the light reaching a sensing element in the image sensor array 202 comes from portion of the input object 216 directly above the sensor element.

Figure 4A:
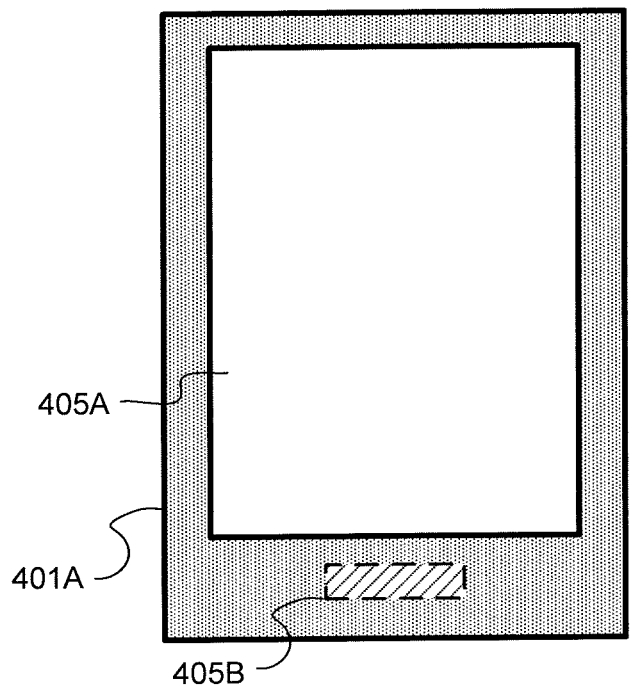
FIGS. 4A-4B are block diagrams illustrating exemplary electronic devices having both a touch screen interface and a fingerprint sensing interface.
Figure 4B:
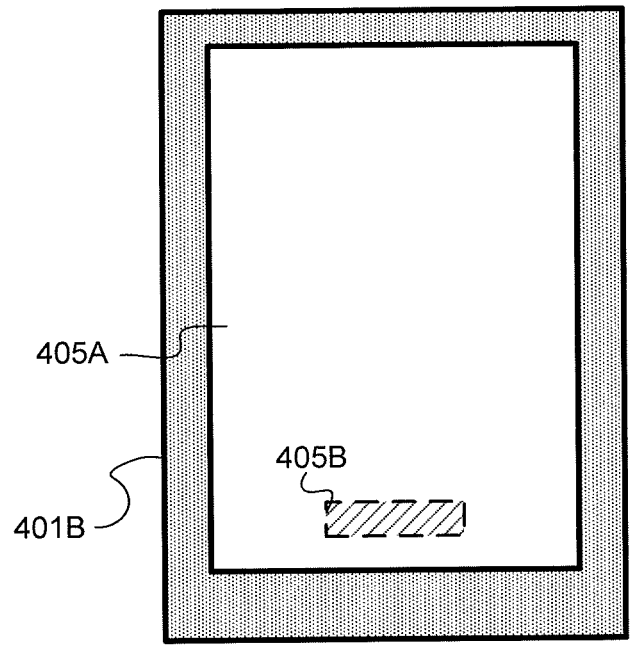

FIGS. 4A-4B are block diagrams illustrating exemplary electronic devices 401A and 401B having both a touch screen interface and a fingerprint sensing interface. In FIG. 4A, the electronic device (e.g., a mobile device, such as a smartphone or tablet) 401A has a fingerprint sensor 405B that is separate from a touch sensor 405A, such that the fingerprint sensor and the touch sensor (of the touch screen) have separate interfaces. In FIG. 4B, the electronic device 401B has a fingerprint sensor 405B that is integrated with the touch sensor 405A, such that the interface for the fingerprint sensor overlaps with the interface for the touch sensor. It will be appreciated that the fingerprint sensor 405B may be limited to only a subset of the area of the touch sensor 405A as generally shown or may be cover an area that is generally coextensive with the touch sensor 405A.

FIG. 5 is a block diagram illustrating another exemplary electronic device 500 having both a touch sensor 502 and a fingerprint sensor 504 integrated in the active area of a display. In certain embodiments, the fingerprint sensor 504 wakes the electronic device 500 (host) from sleep upon authentication of the user. Normally, the display is off or dimmed when the device is in low-power "sleep" mode. When the fingerprint sensor 504 is underneath the cover layer of the display and the device is in sleep mode, it may be difficult for the user to locate the biometric sensor because the display is off and cannot provide an indication of the fingerprint sensor's location. In some embodiments, having an alternate low-power illumination source can provide a visual indication to the user of the location of the fingerprint sensor when the display is off.

Figure 6:
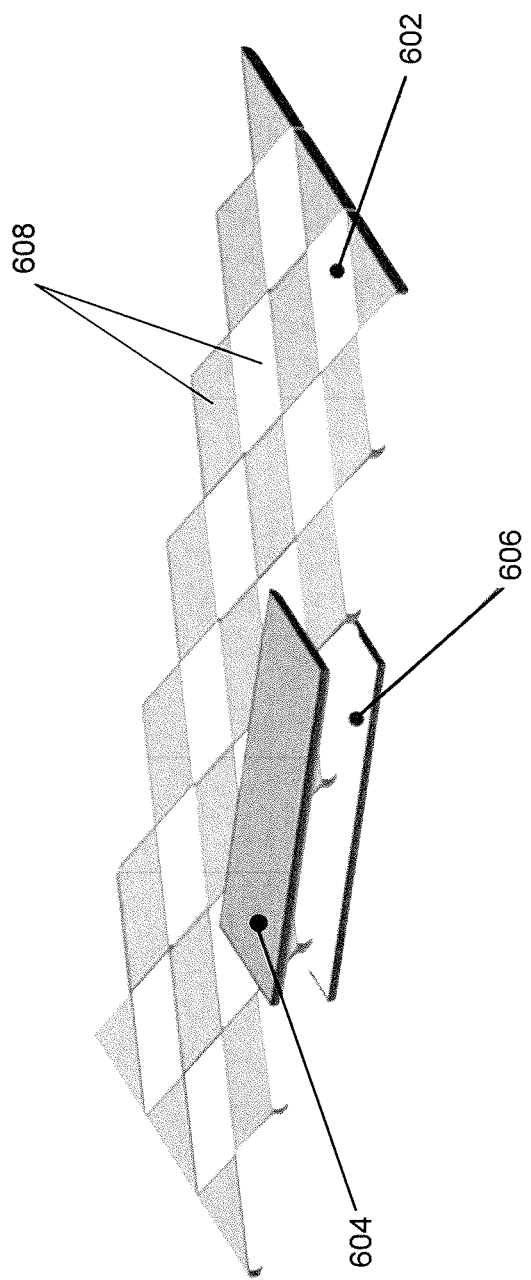
FIG. 6 is a block diagram of an exemplary illumination source underneath a display.

FIG. 6 depicts an exemplary illumination device or element 606 that illuminates the location of a fingerprint sensor 604 where the fingerprint sensor 604 is in the active area of a display 602. Also shown is a diamond pattern touch sensor 608 in the active area of the display 602. Examples of illumination devices 606 include a bulk OLED or discrete LEDs driving a plastic light diffuser from the side. The power consumption of the illumination element 606 can be reduced by dimming the illumination device (by, for instance, lowering the drive current and/or lowering the drive duty-cycle) or by 'throbbing" the illumination device (turning it on for a period of time, and then off for a period of time and repeating).

By construction, some displays are transparent or semi-transparent. The illumination device 606 may be placed underneath such a transparent or semitransparent display. In such a configuration, the fingerprint sensor 604 may also be in or above the display. For example, the fingerprint sensor may include a substantially transparent sensor electrode pattern formed of ITO, micro wires, or some combination thereof, disposed above the display, with an illumination element 606 mounted below or underneath the display to indicate the location of the fingerprint sensing area. During sleep, this illumination device can be driven by a touch controller or fingerprint IC/controller.

In the example of FIG. 6, a discrete illumination device 606 is shown for illuminating a discrete fingerprint sensor 604. In some embodiments, the fingerprint sensor may be integrated throughout the display in which case select display elements (e.g., LEDs, OLEDs, LCD pixels etc.) may be used to illuminate the fingerprint sensing area.

Figure 7A:
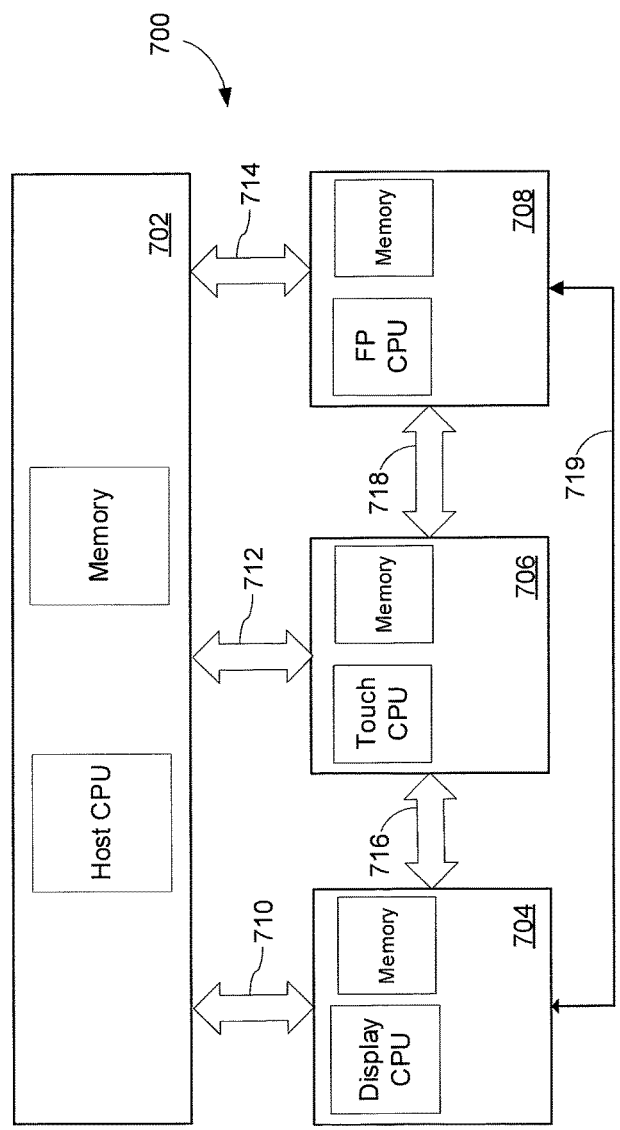
FIG. 7A-7B are block diagrams illustrating control circuitry architecture for an electronic device according to certain embodiments.

FIG. 7A illustrates an example of an architecture of control circuitry 700 for an electronic device having a touch sensor and a fingerprint sensor as shown and described in connection with the preceding figures. The control circuitry 700 includes a host 702, a display controller 704, a touch controller 706, and an optical sensor controller 708. In one implementation, the optical sensor controller 708 is a fingerprint controller. The architecture of FIG. 7A may be used, for example, to implement the ambient light detection and/or proximity detection method described in connection with FIG. 9.

The host 702 includes a processing system (e.g., host CPU, memory, and supporting circuitry and software) for the electronic device, such as a mobile phone or other electronic device as described in the preceding examples. The host typically includes electrical interfaces (e.g., 710, 712, 714) for communicating with the display controller 704, touch controller 706, and optical sensor controller 708.

The display controller 704 includes a processing system (e.g., display CPU, memory, etc.) for the display of the electronic device. An example of a display controller 704 is a Display Driver Integrated Circuit (DDIC). The display controller 704 connects to and drives the display of the electronic device, e.g., controls the display of graphics, text, and like that are visible to user on a display, such as an OLED or LCD display. The display controller 704 may also store preconfigured frames for displaying graphics to facilitate certain processes. For example, in certain embodiments, the display controller 704 may illuminate a portion of the display corresponding to a fingerprint sensing region (e.g., create a finger placement guide) and/or may provide illumination of a finger for imaging using an optical fingerprint sensor.

The optical sensor controller 708 includes a processing system (e.g., fingerprint (FP) CPU, memory, etc.) for interfacing with a fingerprint sensor (e.g., array of optical sensing elements), which have the granularity to detect fingerprint features such as ridges and valleys and in some cases small features such as pores. In other implementations, the fingerprint sensor may comprise capacitive or ultrasonic sensing elements with a corresponding controller 708. The optical sensor controller 708 may be integrated with the fingerprint sensor, or interface to a separate fingerprint sensor. The fingerprint sensor may extend over an entire region of a touch sensing area (e.g., display) or only a discrete portion thereof. Alternatively, the fingerprint sensor may be included in a distinct area as compared to the touch sensing area. When a fingerprint is captured, the optical sensor controller 708 can send a fingerprint image to the host 702 for matching against an enrollment template. Alternatively, if the optical sensor controller 708 is equipped with fingerprint matching capabilities, the optical sensor controller 708 may perform matching (e.g., comparison of the captured fingerprint against enrollment template) itself and, if necessary, wake the host 702 after a successful fingerprint authentication.

The touch controller 706 includes a processing system (e.g., touch CPU, memory, etc.) for interfacing with a touch sensor of the electronic device. The touch controller 706 may, for example, be a touch application specific integrated circuit (ASIC). The touch controller includes control circuitry and software and interfaces with the touch sensor (e.g., array of touch sensing elements, which may be integrated with a display) to sense and process touches by an input object such as a stylus or finger. Any suitable technology may be used for the touch sensor including capacitive touch sensing, optical touch sensing, and the like, as previously described.

In certain embodiments, the touch controller 706 uses two-way communication with the display controller 704, represented by electrical interface 716, and optical sensor controller 708, represented by electrical interface 718. Direct connection between the touch controller 706 and optical sensor controller 708 allows, for example, the touch controller 706 send a signal to wake up the optical sensor controller 708 and initiate fingerprint capture in response to a valid touch without waking the host 702. Direct connection between touch controller 706 and display controller 704 allows the display to be used as a light source for illuminating the finger for an optical fingerprint sensor without waking the host 702. In some implementations, however, the host 702 may optionally be used for communicating with the touch controller 706, display controller 704 and/or optical sensor controller 708 at any point in the process.

In certain embodiments, the optical sensor controller 708 may have direct two-way communication with the display controller 704, represented by electrical interface 719. In this embodiment, the touch controller 706 can wake up the optical sensor controller 708 upon detection of a finger. When ready to image a fingerprint, the optical sensor controller 708 can send a signal directly to the display controller 704 to provide illumination of a corresponding area on the display for optical imaging. Once the fingerprint is imaged, the optical sensor controller 708 can send another signal to the display controller 704 and the display controller 704 can turn off the corresponding area of the display for purposes of imaging or provide a visual signal that fingerprint imaging is complete. The direct two-way communication with the display controller 704 also allows the optical sensor controller 708 to control other aspects of the display such as, for example, displaying a target zone for placement of the finger.

It will be understood that the same or different technologies can be used for touch sensing and fingerprint sensing. For example, the touch sensor and fingerprint sensor can both be capacitive or can both be optical. Alternatively, the touch sensor may be capacitive while the fingerprint sensor is optical or vice versa.

Figure 7B:
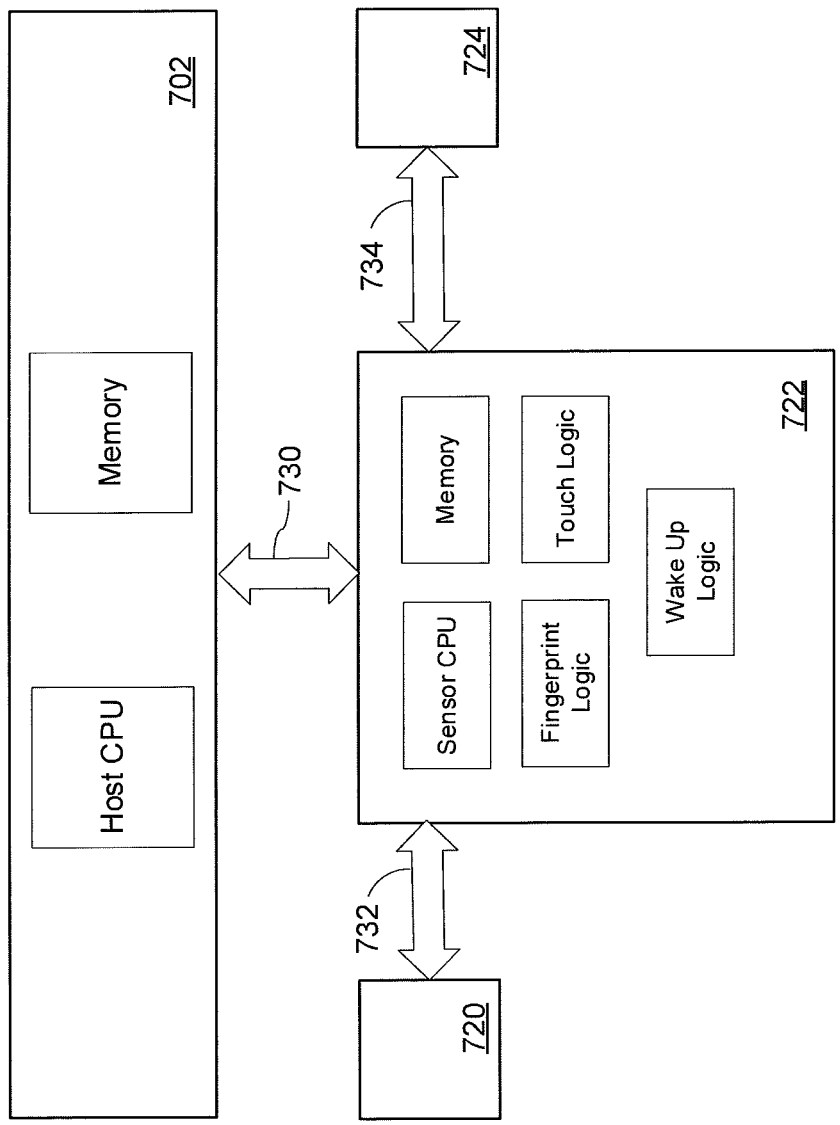

Although shown as separate components, the display controller 704, touch controller 706, and/or optical sensor controller 708, or portions thereof, may be combined on a single controller as illustrated, for example, in connection with FIG. 7B. Similar to FIG. 7A, the architecture of FIG. 7B includes a host 702 having a host CPU and memory. However, in FIG. 7A, the optical sensor controller 708 and touch controller 706 each have their own respective CPU and memory. In FIG. 7B, the optical sensor controller is replaced with an analog fingerprint sensor circuit 720 and the touch controller is replaced with an analog touch sensor circuit 724. The analog fingerprint sensor circuit 720 and/or analog touch sensor circuit 724 may be implemented using any suitable means such as discrete circuits or as separate ICs. The analog fingerprint sensor circuit 720 and/or analog touch sensor circuit 724 may include analog circuitry for conditioning the signal from the fingerprint sensor and/or touch sensor respectively, for example, analog front ends (AFEs), analog-to-digital converters (ADCs), and the like. Also shown are electrical interfaces 730, 732, 734, which provide for communications amongst the various components.

In FIG. 7B, the CPU and processing for the touch sensor and fingerprint sensor are shared in a common digital fingerprint and touch sensor controller 722. As shown, the digital fingerprint and touch sensor controller 722 includes a common sensor CPU (processor), memory, fingerprint logic, touch logic and wake up logic. The digital fingerprint and touch sensor controller 722 may be made from a single die with the analog fingerprint sensor circuit 720 and analog touch sensor circuit 724 being made from one or more separate dies or otherwise implemented with analog circuitry. The digital fingerprint and touch sensor controller 722, analog fingerprint sensor circuit 720, and analog touch sensor circuit 724 may form a single IC or form multiple ICs. The architecture of FIG. 7B may provide cost reduction and/or may be used to reduce latency as a result of less communication amongst multiple processors extending between multiple integrated circuits.

For simplicity, a display controller (for example, DDIC) is not shown in FIG. 7B, but would be connected to, for example, the host 702 and digital fingerprint and touch sensor controller 722. Alternatively, the display controller may be included on controller 722.

It will be understood that the architectures shown and described with reference to FIG. 7A and FIG. 7B are by way of example and a number of variations are possible with respect to implementation. As one example, the display controller, touch controller, and optical sensor controller (e.g., blocks 704, 706, 708 of FIG. 7A) may each form a separate IC. As yet another embodiment, the optical sensor controller, touch controller, and display controller (e.g., blocks 704, 706 and 708 of FIG. 7A) may all be integrated within a single IC. As another alternative, the optical sensor controller may form one IC with an integrated touch and display controller forming a separate IC. As yet another example, and as shown and described in FIG. 7B, the fingerprint and touch sensor circuit (720, 724) may be separate, but may use common integrated control circuitry 722. In this case, the display control circuitry may be separate from the digital fingerprint and touch controller 722 or, alternatively, may be combined with the digital and fingerprint touch controller 722.

Figure 8:
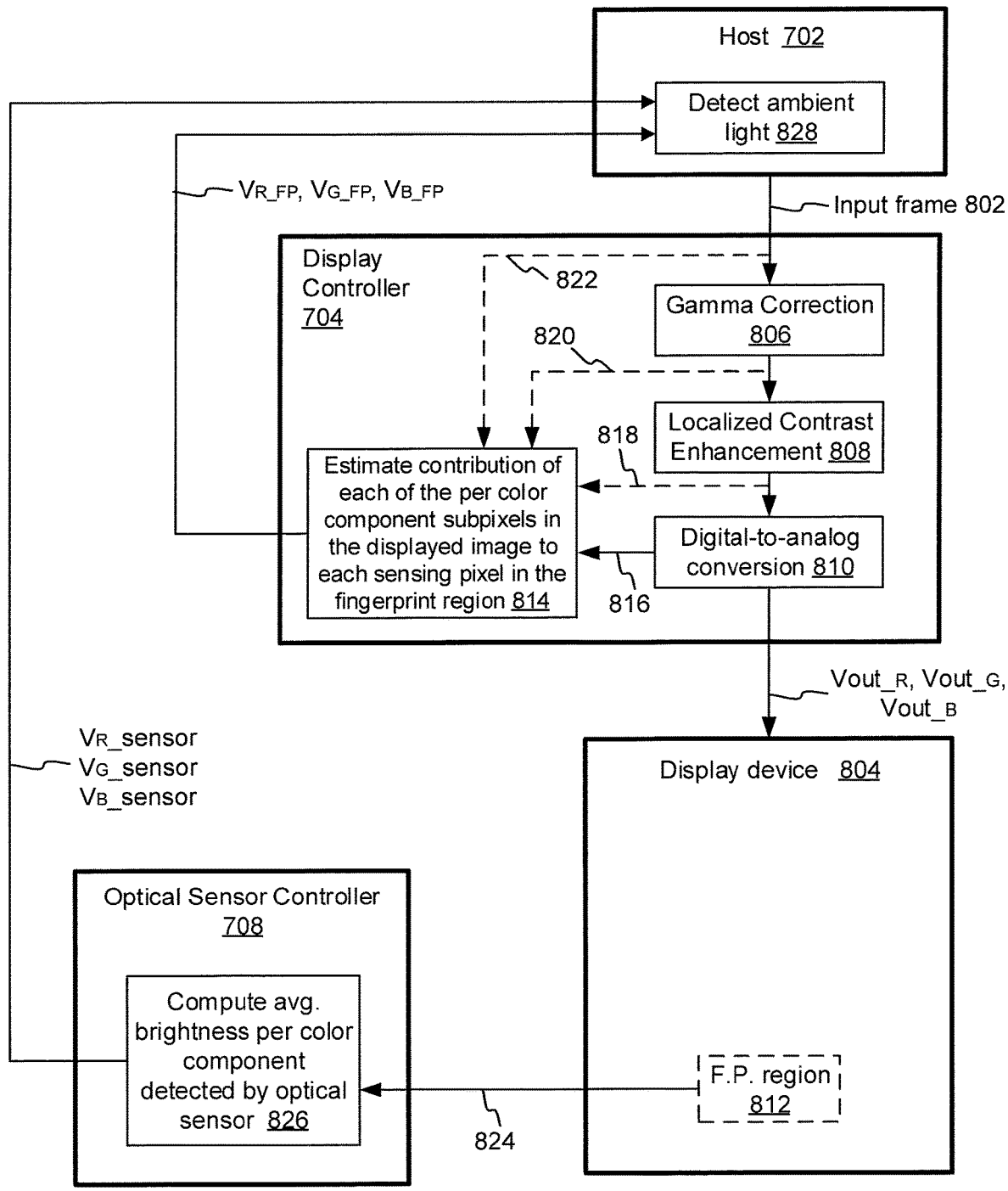
FIG. 8 is a block diagram illustrating determining ambient light and/or proximity of an object using an optical sensor, according to one embodiment.

FIG. 8 is a block diagram illustrating determining ambient light and/or proximity of an object using an optical sensor, according to one embodiment. The electronic device, such as a smartphone, includes a host 702, as described above. In various implementations, the host 702 can be a GPU (graphics processing unit) or CPU (central processing unit) of the electronic device. The host 702 generates an input frame 802 to be displayed on a display device 804. In one implementation, the display device 804 is an OLED display, such as for example shown in FIG. 3B. The input frame 802 comprises digital data for each color component (e.g., R: red, B: blue, G: green) for each pixel of the input frame 802.

The input frame 802 is transmitted from the host 702 to the display controller 704. In one implementation, the display controller 704 comprises a DDIC (display driver integrated circuit). The display controller 704 implements functionality to convert the digital input frame 802 to analog voltages level for each color component (e.g., $V_{out\_R}$, $V_{out\_G}$, $V_{out\_B}$) to drive the pixels of the display device 804. In one implementation, the display controller 704 is configured to perform gamma correction 806, localized contrast enhancement 808, and/or digital-to-analog conversion 810, among other operations. In some embodiments, gamma correction 806, or simply "gamma," comprises a nonlinear operation used to encode and decode luminance or tristimulus values in video or still images. In some embodiments, localized contrast enhancement 808 comprises image enhancement manipulations to increase the perceptual information contained in an image for better representation by, for example, contrast enhancement, deblurring, or denoising. In some embodiments, digital-to-analog conversion 810 comprises converting digital representations of pixel color values (e.g., R, G, B) to analog voltage values, or drive signals, to drive the pixels of the display device 804. Although the embodiment in FIG. 8 shows the blocks 806, 808, 810 being performed in a certain order (i.e., block 806 first, then block 808, then block 810), the blocks 806, 808, 810 can be performed in any order or in parallel in other embodiments.

In various implementations, each of functional blocks 806, 808, 810 can be implemented as software (i.e., instructions executed by a processor), hardware (e.g., dedicated circuitry), or a combination of software and hardware. In the example shown in FIG. 8, each of functional blocks 806, 808, 810 is depicted as a separate unit, although two or more of the functional blocks 806, 808, 810 can be combined into one or more functional units.

The output voltage level for each color component (e.g., $V_{out\_R}$, $V_{out\_G}$, $V_{out\_B}$) is output from the display controller 704 to the display device 804 to drive the pixels of the display device 804, which causes a representation of the input frame 802 to be displayed on the display device 804. As also described herein, a portion of the display device 804 may be configured as an optical sensor to capture an image of a fingerprint. A location of the optical sensor within a display area of the display device 804 is referred to as fingerprint region 812. See, for example, FIG. 4B and FIG. 5. In some implementations, the optical sensor circuitry is disposed below the illumination layer (e.g., OLED layer) of the display device 804.

As described in greater detail herein, the optical sensor can be used to detect the amount of ambient light in the environment of the electronic device. However, in some implementations, the light emitted by the illumination layer can affect the amount of measured light detected by the optical sensor. As such, embodiments of the disclosure can compensate for this additional light emitted by the illumination layer of the display device 804 when determining the amount of ambient light.

As shown in FIG. 8, the display controller 704 also includes functional block 814 configured to estimate a contribution of each of the per color component (e.g., R, G, B) subpixels in the displayed image to each sensing pixel in the fingerprint region 812 of the display device 804. As described, the optical sensor in the fingerprint region 812 is in a fixed location on the display device 804 (e.g., affixed with adhesive to a portion of the display device 804). As such, the coordinates of the fingerprint region 812 are known, and can be stored in the display controller 704. Functional block 814 is configured to take as input the output of the digital-to-analog conversion 810, and based on the location of the fingerprint region 812, estimate a contribution of each of the per color component (e.g., R, G, B) subpixels in the displayed image to each sensing pixel in the fingerprint region 812 of the display device 804. In some embodiments, functional block 814 is also configured to determine an average brightness of the pixels in the fingerprint region 812 per color component. The output of functional block 814 is shown as $V_{R\_FP}$, $V_{G\_FP}$, $V_{B\_FP}$ in FIG. 8. The values of $V_{R\_FP}$, $V_{G\_FP}$, $V_{B\_FP}$ are then transmitted from the display controller 704 to the host 702. The values of $V_{R\_FP}$, $V_{G\_FP}$, $V_{B\_FP}$ are transmitted via an interface or bus that connects the display controller 704 and the host 702, such as I²C or SPI, for example.

In one implementation, the data that is input into functional block 814 to estimate the contribution of each of the per color component (e.g., R, G, B) subpixels in the displayed image in the fingerprint region may be received after digital-to-analog conversion 810 (i.e., arrow 816). In another implementation, the data that is input into functional block 814 to estimate a contribution of each of the per color component (e.g., R, G, B) subpixels in the displayed image in the fingerprint region may be received after localized contrast enhancement 808 (i.e., arrow 818). In yet another implementation, the data that is input into functional block 814 to estimate a contribution of each of the per color component (e.g., R, G, B) subpixels in the displayed image in the fingerprint region may be received after gamma correction 806 (i.e., arrow 820). In yet another implementation, the data that is input into functional block 814 to estimate a contribution of each of the per color component (e.g., R, G, B) subpixels in the displayed image in the fingerprint region may be received from host 702 (i.e., before performing gamma correction 806, localized contrast enhancement 808, or digital-to-analog conversion 810) (i.e., arrow 822).

As also shown in FIG. 8, while the representation of the input image is being displayed on the display device 804, the optical sensor in the fingerprint region 812 is configured to detect an amount of light incident on the optical sensor. The amount of light may be detected per color components of subpixels in the displayed image to each sensing pixel in the fingerprint region 812 of the display device 804 and transmitted to the optical sensor controller 708 (i.e., arrow 824). The optical sensor controller 708 is configured to compute, at functional block 826, an average brightness per color component, or without averaging for all above mentioned subpixels estimate the contribution of each per color component, detected by the optical sensor in the fingerprint region 812 (shown as $V_{R\_sensor}$, $V_{G\_sensor}$, $V_{B\_sensor}$). The values of $V_{R\_sensor}$, $V_{G\_sensor}$, $V_{B\_sensor}$ are then transmitted from the optical sensor controller 708 to the host 702. In one embodiment, the values of $V_{R\_sensor}$, $V_{G\_sensor}$, $V_{B\_sensor}$ are transmitted from the optical sensor controller 708 to the host 702 over a digital interface, such as, for example, I²C (Inter-Integrated Circuit) or SPI (Serial Peripheral Interface). Also, in some embodiments, the values of $V_{R\_sensor}$, $V_{G\_sensor}$, $V_{B\_sensor}$ are transmitted from the optical sensor controller 708 at a periodic interval. In some implementations, the periodic interval may be the refresh cycle of the display device (e.g., each Vsync event).

The host 702, at functional block 828, is configured to determine an amount of ambient light based on the values of $V_{R\_FP}$, $V_{G\_FP}$, $V_{B\_FP}$ received from the display controller 704 and the values of $V_{R\_sensor}$, $V_{G\_sensor}$, $V_{B\_sensor}$ received from the optical sensor controller 708. In one embodiment, performing functional block 828 comprises performing an transform on the received data. In one implementation, the transform comprises a subtraction.

For example, performing functional block 828 may comprise computing:

$$V_{R\_amb} = V_{R\_sensor} - V_{R\_FP}$$

$$V_{G\_amb} = V_{G\_sensor} - V_{G\_FP}$$

$$V_{B\_amb} = V_{B\_sensor} - V_{B\_FP}$$

The values of $V_{R\_amb}$, $V_{G\_amb}$, $V_{B\_amb}$ can then be aggregated to computer a final value for the amount of ambient light. In some implementations, aggregating $V_{R\_amb}$, $V_{G\_amb}$, $V_{B\_amb}$ comprises computing:

$$V_{amb} = (W_R * V_{R\_amb}) + (W_G * V_{G\_amb}) + (W_B * V_{B\_amb})$$

In one embodiment, $W_R$, $W_G$, and $W_B$ correspond to weighting values for red, green, and blue color components, respectively. In one example, each of $W_R$, $W_G$, and $W_B$ is the same (e.g., 0.33). In other examples, $W_R$, $W_G$, and $W_B$ can be different weights per color component (e.g., $W_R$=0.2, $W_R$=0.5, $W_R$=0.3).

Based on the $V_{amb}$ computed at functional block 828, the host 702 may perform certain actions based on the amount of ambient light, e.g., increase or decrease the brightness of the display device 804, or turn off the display device 804.

In some embodiments, the amount of light $V_{amb}$ computed by functional block 828 can be used as a proximity sensor.

In one embodiment, an ambient light is used to illuminate the hovering object and the amount of light $V_{amb}$ is computed, as described in FIG. 8. The amount of light $V_{amb}$ includes a component due to the ambient light reflected from the hovering object. In one implementation, the ambient light conditions are changing slower than the reflected light from the hovering object at a varying distance to the screen. The host 702 may be configured to execute an algorithm in firmware or in software host to extract the reflected light component proportional to a change of the hovering distance. One example for such algorithm is a temporal high-pass filter.

In another embodiment for proximity detection, a hovering object is illuminated by light emitted from a screen of the display device 804, which reflects from the hovering object. The host 702 may be configured to execute an algorithm in firmware or in software host to extract the reflected light component proportional to a change of the hovering distance.

In another embodiment for proximity detection, a hovering object is illuminated by a dedicated source of light in visible or invisible part of spectrum, which reflects from the hovering object. The host 702 may be configured to execute an algorithm in firmware or in software host to extract the reflected light component proportional to a change of the hovering distance.

As shown in the example implementation in FIG. 8, functional block 814 is included in the display controller 704, functional block 826 is included in the optical sensor controller 708, and functional block 828 is included in the host 702. In should be understood, however, that the functional blocks 814, 826, 828 can be located anywhere in the electronic device. For example, functional block 814 can be included in the optical sensor controller 708 or host 702, functional block 826 can be included in the display controller 704 or host 702, and functional block 828 can be included in the display controller 704 or optical sensor controller 708. In addition, in other examples, any one of the functional blocks 814, 826, 828 can be included in a touch controller (e.g., touch controller 706 in FIG. 7A). Also, in various embodiments, functional blocks 814, 826, 828 can be implemented as software, hardware, or a combination of software and hardware.

In one implementation, the computations shown in FIG. 8 to determine the amount of ambient light may be performed for each frame that display device 804 is on and displaying an image. In another implementation, the computations shown in FIG. 8 to determine an amount of ambient light may be performed every N frames, where N is greater than 1. In yet another implementation, blocks 814 and 826 are performed for a series of frames (e.g., M frames, where M is greater than 1), the results of the series of frames may be aggregated (e.g., averaged together), and then the aggregated results are forwarded to functional block 828 to compute the ambient light in the environment.

In some embodiments, there may be more than one fingerprint region 812 (i.e., more than one optical sensor) within the display area the display device 804. In such embodiments, the functional block 826 may be configured to aggregate (e.g., average) the measured brightness values from two or more fingerprint regions when computing the average brightness per color component detected by the one or more optical sensors. In another embodiment, the entire display screen may comprise the fingerprint region 812. In such an embodiment, the average brightness computed at functional block 826 may be based on the brightness detected by the entire optical sensor.

Figure 9:
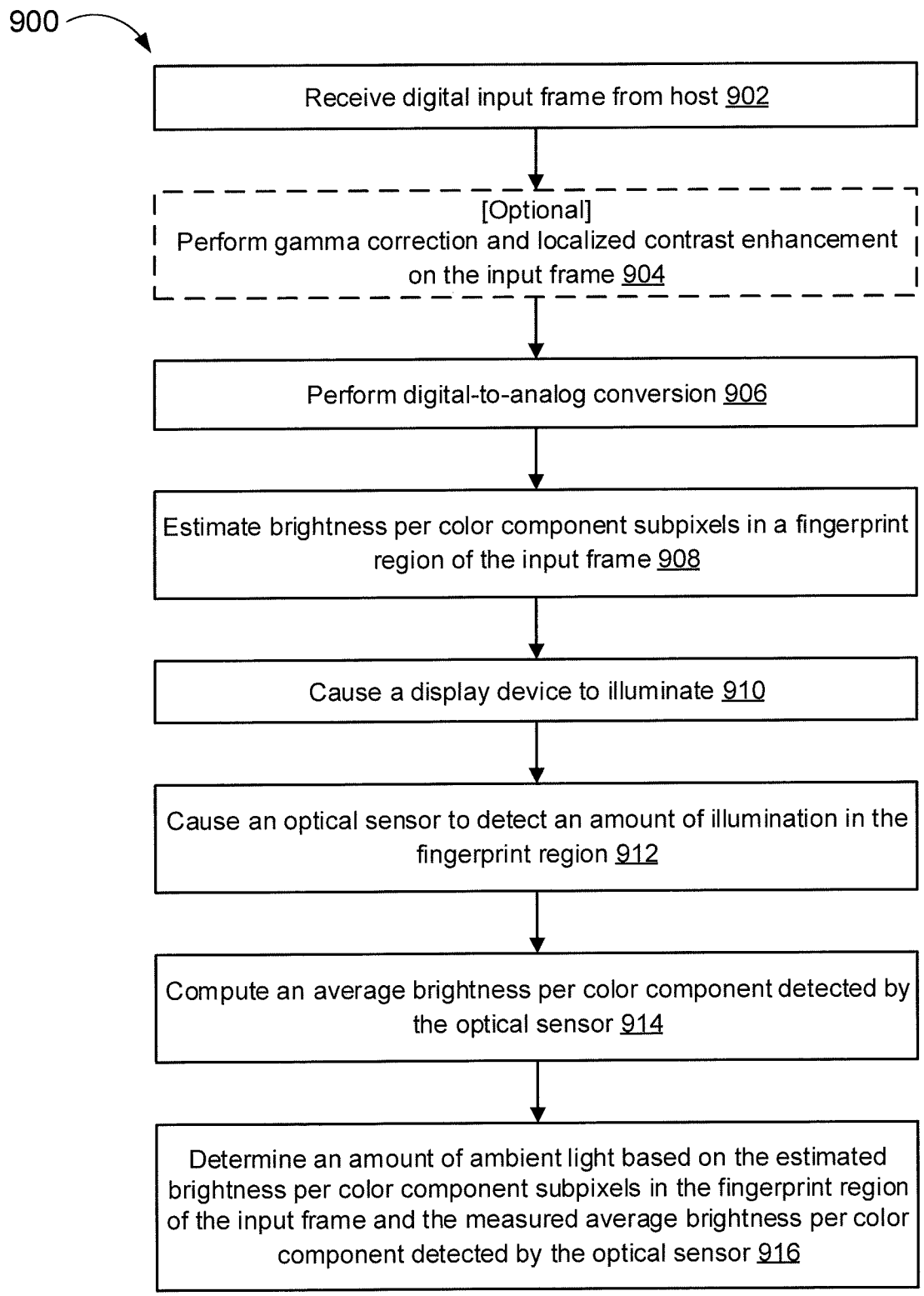
FIG. 9 shows a method 900 for determining an amount of ambient light incident onto an electronic device, in accordance with one embodiment.

FIG. 9 shows a method 900 for determining an amount of ambient light incident onto an electronic device, in accordance with one embodiment. At step 902, one or more processors receive digital input frame from host. According to various embodiment, the one or more processor may comprises a display controller, an optical sensor controller, and/or a touch controller. In one implementation, step 902 is performed by the display controller. The digital input frame comprises color component values (e.g., R, G, B) for each pixel to be displayed on a display device.

At step 904, one or more processors optionally perform gamma correction and localized contrast enhancement on the input frame. At step 906, one or more processors perform digital-to-analog conversion on the input frame (which may have been optically processed by step 904) to generate voltages to drive the pixels of the display device. In one implementation, step 906 is performed after step 904. In one implementation, steps 904 and/or 906 are performed by the display controller.

At step 908, one or more processors estimate a contribution of each of the per color component (e.g., R, G, B) subpixels in the displayed image to each sensing pixel in the fingerprint region of the display device. As described, the location of the fingerprint region is fixed or known, e.g., located under a portion of the display area of the display device. In one implementation, the one or more processors compute, at step 908, the average brightness per color component subpixels in the fingerprint region of the input frame based on the location of the fingerprint region and color components of those pixels in the fingerprint region. In one embodiment, the input to step 908 is the output of step 906. In one implementation, step 908 is performed by the display controller.

At step 910, one or more processors cause a display device to illuminate with a representation of the input frame. At step 912, one or more processors cause an optical sensor to detect an amount of illumination in the fingerprint region. As described, the optical sensor may be located below the display device (e.g., below an OLED illumination layer of the display device). In one implementation, step 912 is performed while the display device is illuminated with the representation of the input frame (step 910).

At step 914, one or more processors compute an average brightness per color component detected by the optical sensor. In one implementation, step 914 is performed by the optical sensor controller, i.e., the controller for the optical sensor (e.g., fingerprint sensor).

At step 916, one or more processors determine an amount of ambient light incident onto the electronic device based on the estimated contribution of each of the per color component (e.g., R, G, B) subpixels in the displayed image to each sensing pixel in the fingerprint region of the display device and the computed average brightness per color component detected by the optical sensor. The outputs of steps 908 and 914 are used to compute the ambient light illumination. For example, the estimated contribution of each of the per color component (e.g., R, G, B) subpixels in the displayed image to each sensing pixel in the fingerprint region can be subtracted from the computed average brightness per color component detected by the optical sensor, per color component. The results of said subtraction, per color component, can then be aggregated together to compute a value for the ambient light illumination. In some embodiments, the aggregated result can be used for proximity detection, as described above.

By performing ambient light detection and/or proximity detection using the optical sensor, the cost of the electronic device is decreased. In addition, by using the optical sensor for ambient light detection and/or proximity detection without the dedicated proximity sensor and the dedicated ambient light sensor, a display screen of the electronic device can extend from "edge-to-edge."

One embodiment of the disclosure provides a device for determining an amount of ambient light illumination. The device comprises a first controller and a second controller. The first controller is configured to: receive an input frame from a host, wherein the input frame comprises digital information for each color component for each pixel of the input frame, perform digital-to-analog conversion on the input frame to generate one or more analog drive signals, determine an average brightness per color component in an optical sensing region of the input frame, wherein the optical sensing region corresponds to a location of an optical sensor in a display device, and cause the display device to be illuminated with a representation of the input frame based on the one or more analog drive signals. The second controller is configured to: determine an average brightness per color component based on an amount of illumination detected by the optical sensor in the optical sensing region, wherein the amount of ambient light illumination is determined by the device based on the average brightness per color component in the optical sensing region of the input frame and the average brightness per color component detected by the optical sensor.

In one aspect of the disclosure, the amount of ambient light illumination is determined by the host or the first controller or the second controller. In one aspect of the disclosure, determining the amount of ambient light illumination comprises performing a transformation on the average brightness per color component in the optical sensing region of the input frame and the average brightness per color component detected by the optical sensor. In one aspect of the disclosure, performing the transformation comprises subtracting the average brightness per color component in the optical sensing region of the input frame from the average brightness per color component detected by the optical sensor. In one aspect of the disclosure, results per color component of performing the transformation are aggregated to determine the amount of ambient light illumination. In one aspect of the disclosure, aggregating the results per color component comprises applying a weighting factor to each color component. In one aspect of the disclosure, the optical sensor detects the amount of illumination in the optical sensing region while the display device is illuminated with the representation of the input frame. In one aspect of the disclosure, the first controller comprises a display controller for controlling a display device and the second controller comprises an optical sensor controller for controlling an optical sensor.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for determining an amount of ambient light illumination, the method comprising:
    for each color component of a plurality of color components, receiving an estimated contribution of the color component in an optical sensing region of an input frame to be displayed on a display device, wherein the optical sensing region corresponds to a location of an optical sensor in a display region of the display device, and wherein the input frame comprises digital information for each color component of the plurality of color components for each pixel of the input frame;
    for each color component, receiving, from an optical sensor controller, an amount of illumination of the color component in the optical sensing region detected by the optical sensor while the display device is illuminated with a representation of the input frame, wherein the optical sensor includes optical sensing elements having a granularity configured to detect ridges and valleys of a fingerprint of a finger;
    generating a plurality of ambient light contribution values corresponding to the plurality of color components, respectively, wherein generating the plurality of ambient light contribution values comprises: for each color component, determining an ambient light contribution value for the color component based on subtracting the estimated contribution of the color component in the optical sensing region of the input frame from the amount of illumination of the color component in the optical sensing region detected by the optical sensor; and
    aggregating the plurality of ambient light contribution values to determine the amount of ambient light illumination.

2. The method of claim 1, wherein gamma correction and localized contrast enhancement is performed on the input frame.

3. The method of claim 1, wherein aggregating the plurality of ambient light contribution values comprises applying a weighting factor to each ambient light contribution value corresponding to the plurality of color components.

4. The method of claim 1, wherein the estimated contribution of a given color component in the optical sensing region of the input frame is based on an average brightness of the given color component in the optical sensing region of the input frame.

5. The method of claim 1, wherein the amount of illumination of a given color component in the optical sensing region detected by the optical sensor is based on an average brightness of the given color component detected by the optical sensor in the optical sensing region.

6. The method of claim 1, wherein the estimated contribution of a given color component in the optical sensing region of the input frame is received from a display controller configured to convert the input frame to analog voltage levels to drive display elements of the display device.

7. A device for determining an amount of ambient light illumination, the device comprising:
    a display device; and
    one or more controllers configured to:
        for each color component of a plurality of color components, receive an estimated contribution of the color component in an optical sensing region of an input frame to be displayed on a display device, wherein the optical sensing region corresponds to a location of an optical sensor in a display region of the display device, and wherein the input frame comprises digital information for each color component of the plurality of color components for each pixel of the input frame;

for each color component, receive, from an optical sensor controller, an amount of illumination of the color component in the optical sensing region detected by the optical sensor while the display device is illuminated with a representation of the input frame, wherein the optical sensor includes optical sensing elements having a granularity configured to detect ridges and valleys of a fingerprint of a finger;

generate a plurality of ambient light contribution values corresponding to the plurality of color components, respectively, wherein generating the plurality of ambient light contribution values comprises: for each color component, determining an ambient light contribution value for the color component based on subtracting the estimated contribution of the color component in the optical sensing region of the input frame from the amount of illumination of the color component in the optical sensing region detected by the optical sensor; and aggregate the plurality of ambient light contribution values to determine the amount of ambient light illumination.

8. The device of claim 7, wherein gamma correction and localized contrast enhancement is performed on the input frame.

9. The device of claim 7, wherein aggregating the plurality of ambient light contribution values comprises applying a weighting factor to each ambient light contribution value corresponding to the plurality of color components.

10. The device of claim 7,
wherein the estimated contribution of a given color component in the optical sensing region of the input frame is based on an average brightness of the given color component in the optical sensing region of the input frame; and
wherein the amount of illumination of the given color component in the optical sensing region detected by the optical sensor is based on an average brightness of the given color component detected by the optical sensor in the optical sensing region.

11. The device of claim 7, wherein the estimated contribution of a given color component in the optical sensing region of the input frame is received from a display controller configured to convert the input frame to analog voltage levels to drive display elements of the display device.

12. A controller configured to determine an amount of ambient light illumination, the controller comprising:
first circuitry configured to receive, for each color component of a plurality of color components, an estimated contribution of the color component in an optical sensing region of an input frame to be displayed on a display device, wherein the optical sensing region corresponds to a location of an optical sensor in a display region of the display device, and wherein the input frame comprises digital information for each color component of the plurality of color components for each pixel of the input frame;
second circuitry configured to receive, for each color component, from an optical sensor controller, an amount of illumination of the color component in the optical sensing region detected by the optical sensor while the display device is illuminated with a representation of the input frame, wherein the optical sensor includes optical sensing elements having a granularity configured to detect ridges and valleys of a fingerprint of a finger;
third circuitry configured to generate a plurality of ambient light contribution values corresponding to the plurality of color components, respectively, wherein generating the plurality of ambient light contribution values comprises: for each color component, determining an ambient light contribution value for the color component based on subtracting the estimated contribution of the color component in the optical sensing region of the input frame from the amount of illumination of the color component in the optical sensing region detected by the optical sensor; and
fourth circuitry configured to aggregate the plurality of ambient light contribution values to determine the amount of ambient light illumination.

13. The controller of claim 12,
wherein the estimated contribution of a given color component in the optical sensing region of the input frame is based on an average brightness of the given color component in the optical sensing region of the input frame; and
wherein the amount of illumination of the given color component in the optical sensing region detected by the optical sensor is based on an average brightness of the given color component detected by the optical sensor in the optical sensing region.

* * * * *